May 16, 1961 W. S. HLAVIN 2,984,771
ELECTROMAGNETIC DEVICE
Filed Oct. 24, 1958 6 Sheets-Sheet 1
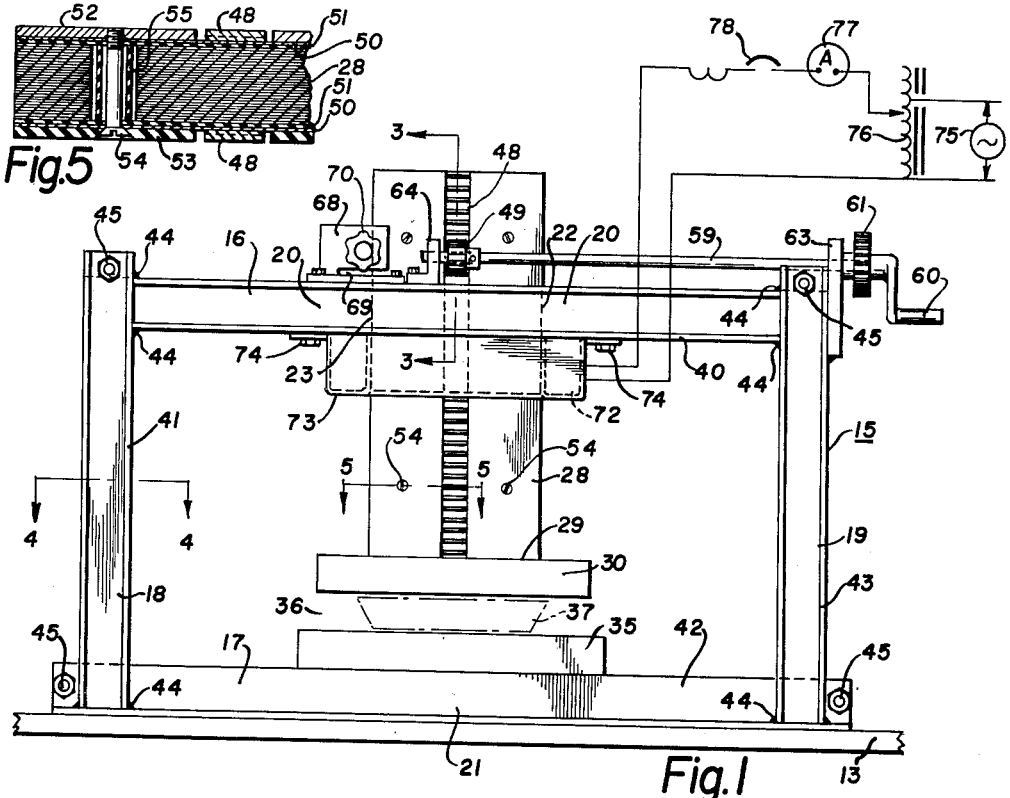
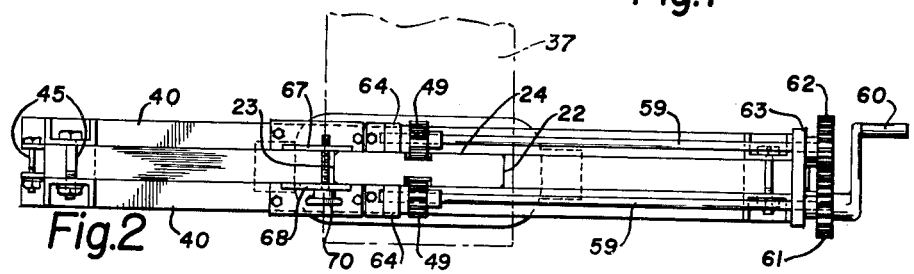
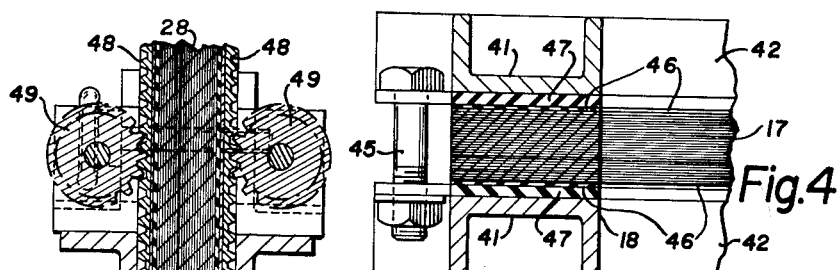
INVENTOR.
WILLIAM S. HLAVIN
BY Hoodling and Kroot
attys.

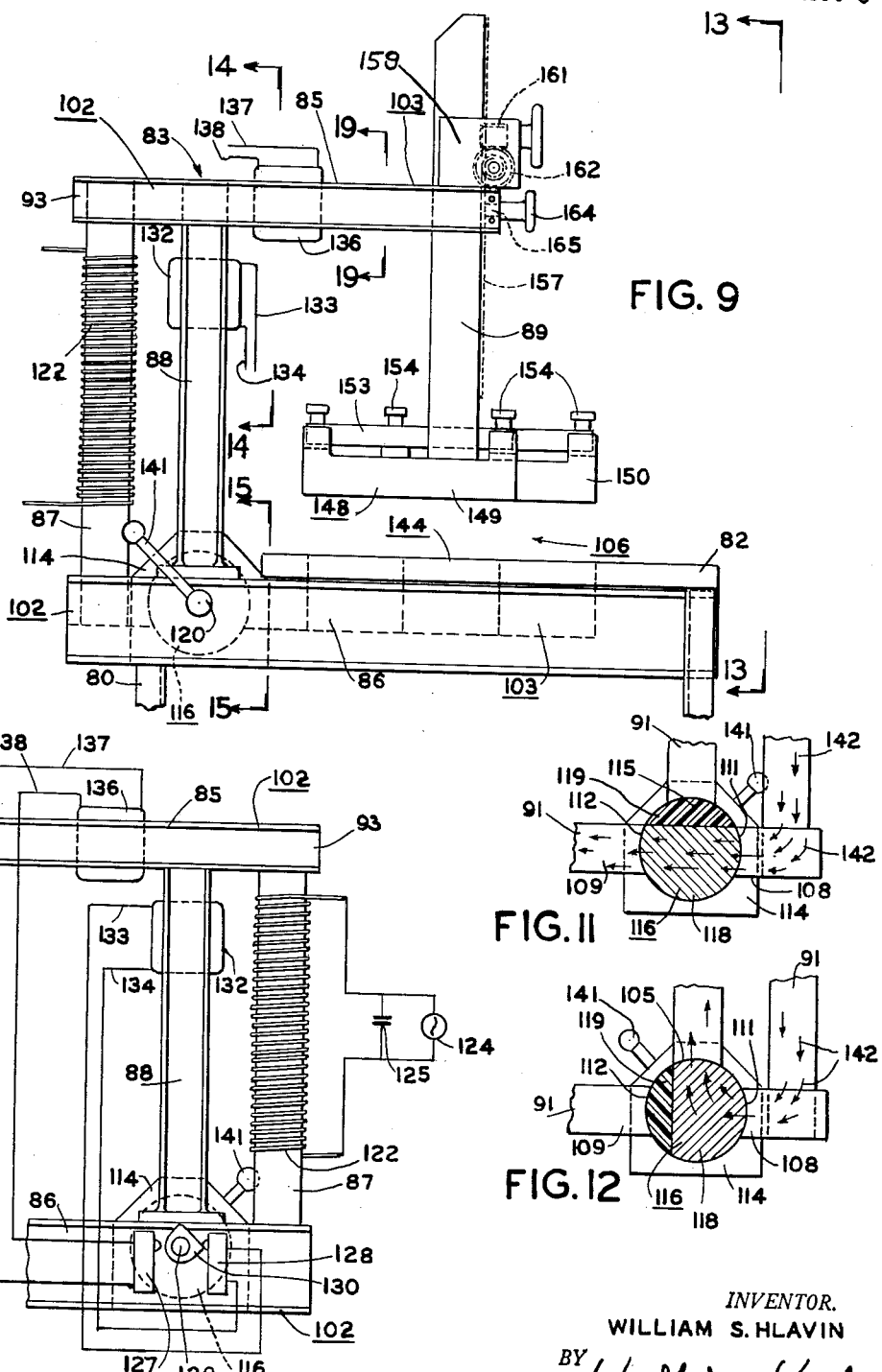

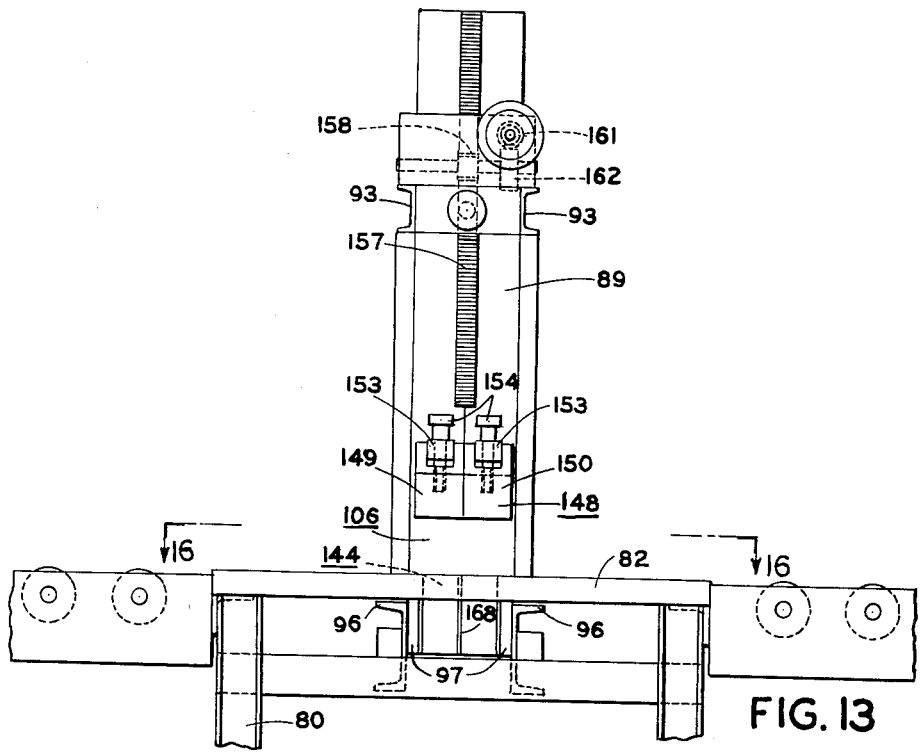
FIG. 13
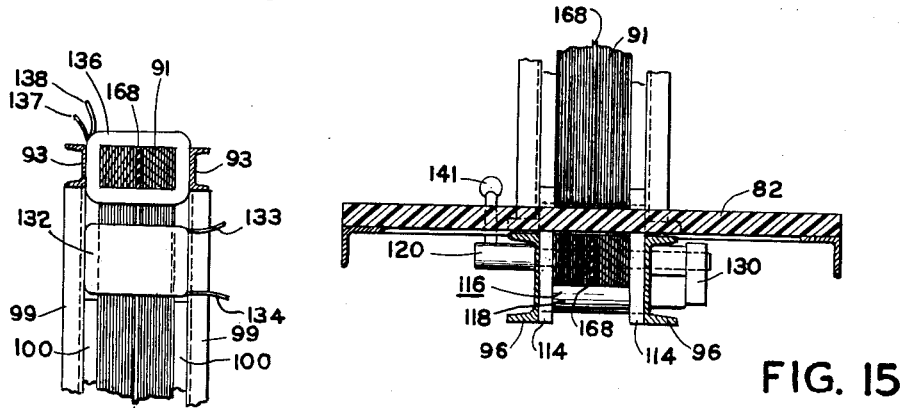
FIG. 14
FIG. 15
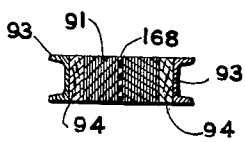
FIG. 19
*INVENTOR.*
WILLIAM S. HLAVIN
BY Woodling & Krost
ATTORNEYS

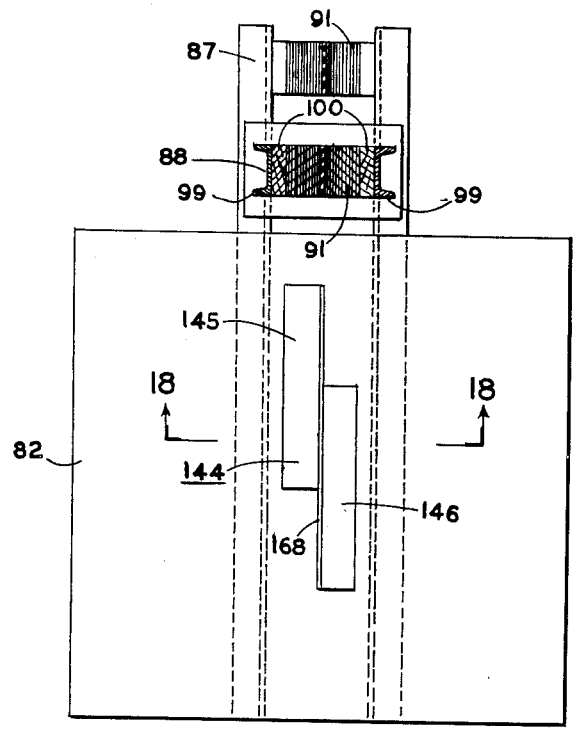
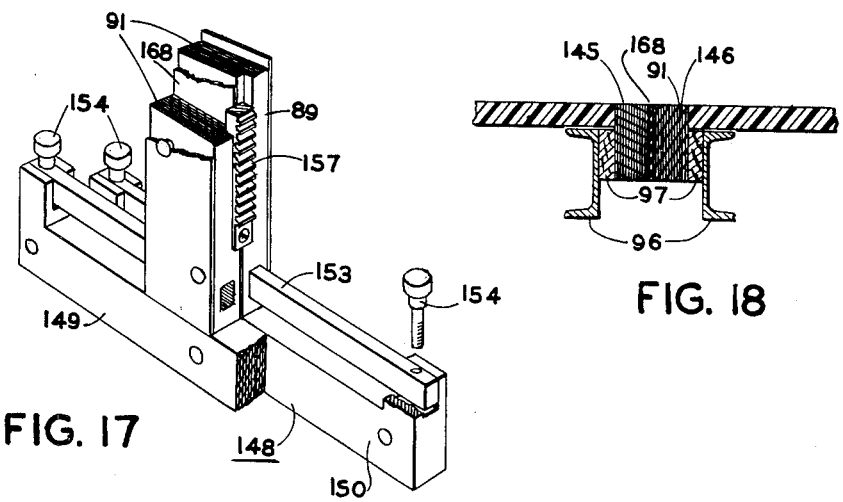

May 16, 1961

W. S. HLAVIN 2,984,771

ELECTROMAGNETIC DEVICE

Filed Oct. 24, 1958

*INVENTOR.*
WILLIAM S. HLAVIN
BY
Woodling & Krost
ATTORNEYS

United States Patent Office 2,984,771
Patented May 16, 1961

2,984,771
ELECTROMAGNETIC DEVICE
William S. Hlavin, Cleveland, Ohio, assignor to Transformer Engineering Corporation, a corporation of Ohio Filed Oct. 24, 1958, Ser. No. 769,979
17 Claims. (Cl. 317—157.5)

The invention relates in general to apparatus for demagnetizing a magnetic body and more particularly to apparatus for demagnetizing machine dies and the like.

The invention also relates to magnetic devices in general and more particularly to means located in a magnetic circuit for diverting substantially all or a part of the magnetic flux from one leg of the circuit to another.

An object of the invention is a provision of a magnetic circuit for demagnetizing a magnetic body such as machine dies whereby the magnetic flux is directed to flow through the magnetic body or dies being demagnetized.

Another object of the invention is a provision of a magnetic circuit having an air gap through which the magnetic body or machine die to be demagnetized is passed, the magnetic circuit directing flux directly through the magnetic body or machine die as it is demagnetized.

Another object of the invention is a provision for varying the size of the air gap to accommodate machine dies of different sizes.

Another object of the invention is a provision of a magnetic loop circuit having opposed magnetic portions which establish magnetic poles between which the magnetic body or machine die is placed for demagnetization.

Another object of the invention is a provision of dividing or separating the magnetic loop circuit into halves, with each half of the loop circuit being separately magnetized.

Another object of the invention is a provision of a variable reactor to vary the voltage applied to the magnetizing coil, taken in combination with a capacitor for power factor correction in order to employ a variable reactor of a small size.

Another object of the invention is to provide a demagnetizer wherein a variable reactor is not required.

Another object of the invention is to provide a demagnetizer which has first and second closed loop portions wherein provision is made to pass a body to be demagnetized between opposed poles in the second loop portion with diverter means which distributes the flux flow between said first and second closed loop portions.

Another object of the invention is to provide a demagnetizer which has first and second closed loop portions and a diverter to distribute flux flow between the loop portions with choke coils on the first and second loop portions to aid the diverter and operable in accordance with the position of the diverter.

Another object of the invention is to provide a cylindrical diverter core which includes a segmental portion of magnetic conducting material and a segmental portion of non-magnetic material.

Another object of the invention is to provide a diverter core which includes a segment of an annular configuration.

Another object of the invention is to provide a demagnetizer having permeable core means with first and second opposed pole pieces between which a magnetized object is to be placed with insulation means to divide the core means into two parts and to offset the divided portions of the pole pieces with respect to each to obtain better flux distribution through the object.

Another object of the invention is to provide a demagnetizer with an adjustable leg member having an adjustable pole piece thereon.

Another object of the invention is to provide a magnetic device having first, second and third legs with diverter means for distributing flux induced on said first leg between the second and third legs.

Other objects and a fuller understanding of the invention may be had by referring to the following specification and claims, taken in conjunction with the accompanying drawings in which:

Figure 1 is a side elevational view of the demagnetizer;

Figure 2 is a plan view of Figure 1 and shows principally the rack and pinion mechanisms for varying the width of the air gap in the magnetic circuit;

Figure 3 is an enlarged cross sectional view, taken along the line 3—3 of Figure 1;

Figure 4 is an enlarged cross sectional view, taken along the line 4—4 of Figure 1;

Figure 5 is an enlarged cross sectional view, taken along the line 5—5 of Figure 1;

Figure 9 is a side elevational view of another demagnetizer;

Figure 10 is a fragmentary view taken from the rear of the device shown in Figure 9;

Figure 11 is a view in section of a portion of the device shown in Figure 10 showing a magnetic flux diverter in one position;

Figure 12 is a view similar to Figure 11 but showing the flux diverter in another position;

Figure 13 is a view taken generally along the line 13—13 of Figure 9;

Figure 14 is a view taken generally along the line 14—14 of Figure 9;

Figure 15 is a view taken generally along the line 15—15 of Figure 9;

Figure 16 is a view taken generally along the line 16—16 of Figure 13;

Figure 17 is a fragmentary isometric view of an adjustable magnetic leg member seen in Figures 9 and 13;

Figure 18 is a view taken generally along the line 18—18 of Figure 16;

Figure 19 is a vew taken along the line 19—19 of Figure 9;

Figure 6:
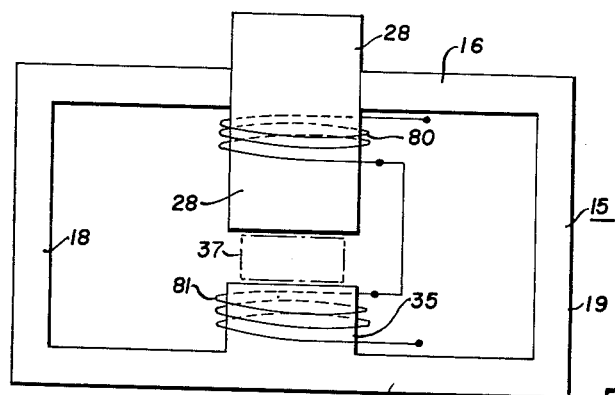
Figure 6 is a diagrammatic showing of the magnetic circuit having two magnetizing windings.

With reference to Figure 1 of the drawing, the magnetic circuit comprises a main magnetic core 15 consisting of a top leg 16, a bottom leg 17 and side legs 18 and 19. The entire magnetic core 15 comprises a closed magnetic loop. The top leg 16 has a top core portion 20 and the bottom leg 17 has a bottom core portion 21. The top core portion 20 and the bottom core portion 21 comprise opposed magnetic poles. The top core portion 20 has two facing ends 22 and 23 which provide a magnetic space 24 in which is slidably mounted a magnetic leg 28. The bottom end of the magnetic leg 28 has a terminating end portion 29 to which there is attached a magnetic pole core member 30. Any suitable means may be employed to fasten the magnetic pole core member 30 to the terminating end portion 29 of the magnetic leg 28.

Mounted centrally on the bottom leg 17 is a magnetic pole core member 35. As illustrated, the pole core members 30 and 35 provide an air gap 36 therebetween in which is mounted a magnetic body or machine die 37 to be demagnetized.

The laminations of the main magnetic core means 15 may be held together by any suitable means and as illustrated in Figures 1 and 4, channel members 40, 41, 42 and 43 are employed for this purpose. The channel members may be welded together in the corners as indicated by the welds 44. The channel members are placed on opposite sides of the stack of laminations and are held together by means of nuts and bolts 45. The channel members are separated from the sides of the stack of lamination by means of an insulation strip 46, see Figure 4. For the top leg 16 and the side legs 18 and 19 a filler insulation member 47 is provided between the insulation strip 46 and the respective channel members, see Figure 4. The reason for the filler insulation member 47 is that the top channel member 40 is butt-welded to the side channel members 41 and 43 whereas the bottom channel member 42 is lap-welded to the side channel members. By employing the channel members and insulation strips 46 and filler insulation members 47 the entire magnetic loop 15 is held together without any bolts or screws extending through the laminations. This construction provides a very efficient magnetic circuit free from magnetic short circuits. The entire assembly may be placed on top of a table 13.

The magnetic leg 28 may be raised or lowered by means of a rack 48 and pinion 49 mounted on opposite sides of the magnetic leg 28. As illustrated in Figure 5, the racks 48 are mounted on opposite sides of the magnetic leg 28 and may be respectively secured to plates 50 which extend across the sides of the stack of laminations. The backs of the racks 48 may be welded directly to the plates 50. The plates 50 are insulated from the stack of laminations by an insulating plate 51. On one side of the stack of lamination for the leg 28 is provided an outside metal plate 52 and on the other side of the stack of lamination of the magnetic leg 28 is mounted an insulation plate 53. Screws 54 extend from the insulation plate 53 to the metal plate 52 and hold the entire assembly together. The screws 54 are mounted respectively inside of insulation sleeves 55 which extend through holes in the lamination. The screws 54 hold the entire leg assembly together with the racks 48 secured to the plates 50. Any suitable means may be employed to anchor the racks 48 to the magnetic leg 28 and the means which has just been described is satisfactory for this purpose because the magnetic circuit is free from magnetic short circuits.

The pinions 49 which engage the racks 48 may be mounted on shafts 59 which are operated by gears 61 and 62 and a crank 60. The shafts 59 may be supported by brackets 63 and 64 mounted on the channel members. As the crank 60 is operated the pinions 49 engage the racks 48 and move the magnetic leg 28 for varying the width of the air gap 36 between the two pole core members 30 and 35. After the position of the magnetic leg 28 is once established by turning the crank 60 the magnetic leg 28 may be held in a fixed position by means of clamping brackets 67 and 68 which are mounted on top of the channel members 40. As illustrated in Figure 1, the clamping bracket 68 is slotted at 69 to make the clamping bracket 68 resilient. A threaded knob 70 extends through the clamping bracket 67 and 68 so that when the knob is tightened the clamping bracket 68 is squeezed against the magnetic leg 28 and holds the leg in a fixed clamped position. The magnetic leg 28 may be unclamped by loosening the threaded knob 70.

The magnetic leg 28 is adapted to be magnetized by a coil 72 surrounding the leg. As illustrated in Figure 1, the coil 72 may be mounted in a housing 73 which is bolted to the bottom side of the channel members 40 by means of bolts 74. The coil 72 is adapted to be energized from source 75, preferably, an alternating current source. A variable reactor 76 is employed to vary the voltage applied to the coil 72. An ammeter 77 may be employed for reading the current flow. Also, a magnetic breaker 78 may be employed for the control and protection of the circuit.

In operation of the device, the magnetic body or machine die which is to be demagnetized, is placed between the two pole core members 30 and 35. The magnetic leg 28 is lowered as low as possible in order to minimize the air gap so that the maximum amount of flux may pass through the magnetic body being demagnetized. After the air gap is properly adjusted, the threaded knob 70 may be tightened to hold the magnetic leg 28 in a fixed position. The coil 72 is now energized and the magnetic body or die is slowly pushed through the air gap 36. As the magnetic body or machine die is pushed through the air gap it is demagnetized. One important aspect of the present apparatus is that the magnetic flux is caused to flow through the magnetic body or machine die without employing the magnetic body or machine die 37 as part of the magnetic circuit other than being located in the air gap 36. The magnetic forcing of the flux through the magnetic body or machine die renders the apparatus very effective in demagnetizing magnetic bodies or machine dies.

Figure 6 shows a modified diagrammatic illustration of the looped magnetic circuit in that a magnetizing coil 80 is mounted around the magnetic leg 28 and a coil 81 is mounted around the pole core member 35. The magnetic body of machine die to be demagnetized is illustrated by the reference 37.

Figure 7:
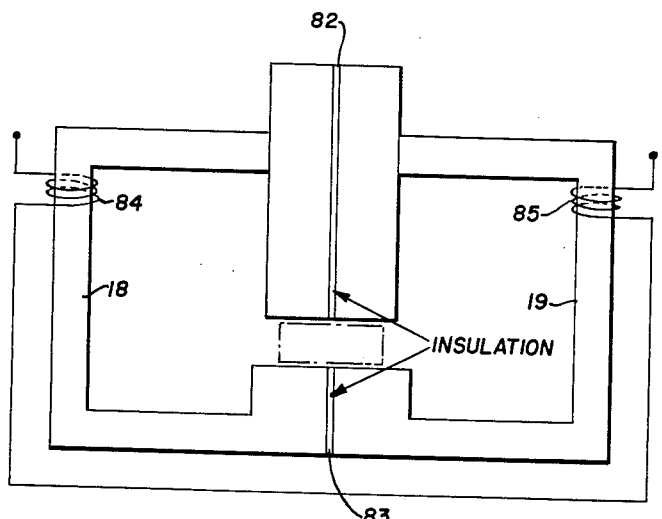
Figure 7 is a modified showing of the invention wherein the magnetic loop consists of two separate and insulated parts with each part separately magnetized.

In Figure 7, the magnetic leg 28 and the pole core member 35 are magnetically separated by insulation members 82 and 83 respectively. The side leg 19 is energized by a coil 85 and the side leg 18 is energized by a coil 84. The insulation members 82 and 83 divide the magnetic loop into two bodies with each part being magnetized by the coils 84 and 85 respectively.

Figure 8:
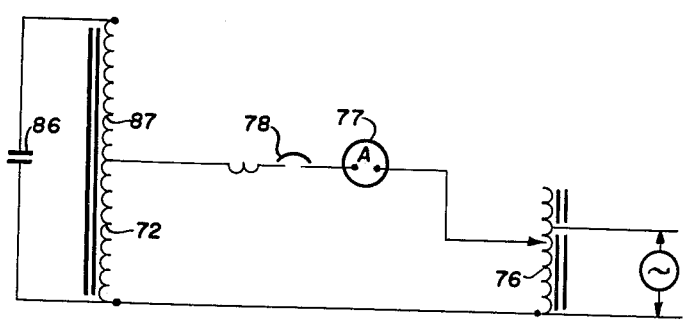
Figure 8 is a diagrammatic showing of a variable reactor to vary the voltage on the magnetizing winding, taken in combination with a capacitor for improving the power factor whereby the variable reactor may be made of a small size.
Figure 21:
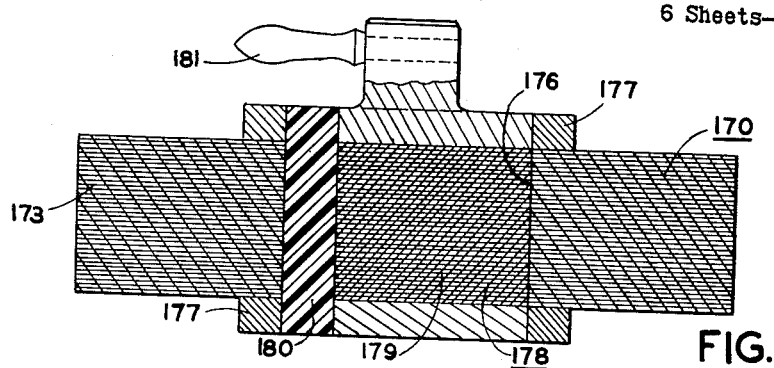
Figure 21 is a view taken generally along the line 21—21 of Fig. 20.

Figure 8 shows an arrangement to correct the lagging power factor of the coil 72 which energizes the magnetic leg 28 by employing a capacitor 86 which is connected across the coil 72 and a secondary winding 87 which surrounds the leg 28. By employing the secondary winding 87, the capacitor 86 may be made small. By correcting the lagging power factor by the use of the capacitor 86 and the secondary winding 87, the size of the variable reactor 76 may be made small in order to reduce the cost of the controls.

In applicant's apparatus the flux flow is directly through all parts of the die being demagnetized as distinguished by prior art devices where the flux takes the shortest magnetic path usually along the skin surface of the die and not throughout the entire body of the die. Applicant's device will accommodate a die at least twelve inches thick or thicker. The length of the die in case of a shear die, may be as much as twelve feet long or more and as the die is pushed through the air gap the demagnetizing process is effective for the complete length of the die.

The demagnetizer which is illustrated in Figures 9–19 includes in combination a frame 80 upon which is horizontally mounted a table 82 of magnetic insulating material or in other words non-magnetic material. Permeable core means 83 are mounted upon the frame and include generally first and second vertically spaced members 85 and 86 as well as first, second and third leg members 87, 88 and 89, respectively. Each of the spaced members and leg members referred to above includes a plurality of laminations 91 which are sandwiched together to form a path for the flow of magnetic flux. The laminations 91 which are included in the first vertically spaced member 85 are secured in position by channel members 93 and the laminations are insulated therefrom, by means of wood members 94. The laminations 91 of the second vertically spaced member 86 are held in position by channel members 96 and are insulated therefrom by means of wood members 97. The laminations 91 of the second leg member are secured in position by means of channel members 99 (Figure 14) and are insulated therefrom by means of wood members 100. The construction of the third leg member will be discussed hereinafter. The details of insulating the core means will not be dealt with extensively, however, it should be kept in mind by those skilled in the art that consideration should be given to properly insulate the laminations which make up the magnetic path from the materials which are used primarily for the purpose of providing a suitable supporting structure.

The first and second vertically spaced members 85 and 86 each are provided with first and second end portions which have been generally referred to by the reference numerals 102 and 103, respectively. The first leg member 87 is secured at its upper end to the first end portion of the first vertically spaced member 85 and extends to the first end portion of the second vertically spaced member 86. It is suitably magnetically connected to the first and second vertically spaced members by any suitable means which are recognized by those skilled in the art. The second leg member 88 is suitably magnetically secured to an intermediate portion of the first vertically spaced member 85 and extends vertically downwardly toward an intermediate portion of the second vertically spaced member. The second leg member terminates short of the second vertically spaced member, as best seen in Figures 11 and 12, in arcuate wall means 105. The arcuate wall means 105 as shown in Figures 11 and 12 lie on the radius of a circle in this embodiment. The third leg member 89 is adjustably secured at an upper portion to the second end portion 103 of the first vertically spaced member and extends vertically downwardly toward the second end portion of the second vertically spaced member. The lowermost portion of the third leg member is spaced from the second vertically spaced member and the table 82 so as to provide an air gap 106 within which a body to be demagnetized may be placed. With the adjustable feature of the demagnetizing device, it is possible to vary the highth of this gap so as to accommodate various sized articles which are to be demagnetized.

The second vertically spaced member 86 comprises first and second portions 108 and 109, respectively. These portions are best indicated in Figures 9, 11, and 12. The portion 108 terminates in arcuate wall means 111 and the portion 109 terminates in arcuate wall means 112 and these wall means are spaced from each other and are of the same radius as the arcuate wall means 105. The wall means 105, 111, and 112 are all located so as to be on the circumference of a circle. A non-magnetic bearing member 114, which might for example be made of aluminum, is positioned at the junction of the above referred to wall means and is for the purpose of making added bearing surface for a cylindrical flux diverter core which will be described hereinafter. The core means 83 of the magnetic device may be described in another manner and may be said to comprise first and second magnetic loop portions. The first magnetic loop portion would include the first and second legs 87 and 88 as well as that portion of the first and second vertically spaced members 85 and 86 which extend between and magnetically connect the first and second leg members. The second loop portion would include a portion of the first loop and would comprise the first and third leg members as well as the first and second vertically spaced members which extend therebetween.

A cylindrical diverter core 116 is positioned within the cylindrical opening which is defined by the bearing member 114 and the arcuate wall means 105, 111, and 112 and includes first and second segmental cylinder portions 118 and 119, respectively. The first segmental cylinder portion 118 comprises magnetic conducting material which is the same as the magnetic conducting material of the core means and this includes a plurality of sandwiched laminations suitably held together. The second segmental cylinder portion 119 is constructed of a non-magnetic material preferably plastic of some suitable construction. It should be pointed out at this time that the diverter core 116 may include only the first segmental cylinder portion while leaving off the second segmental cylinder portion. The plastic insulation would, in this case, be replaced with air insulation. With the use of the second segmental cylinder portion made of plastic material, this gives added bearing to the diverter core and aids in rotation of the same. The diverter core 116 is provided with a shaft 120. A winding 122, which may be referred to as a primary winding, is provided on the first leg member 87 and is electrically connected by conductor means to an alternating current source 124. The winding 122 is for the purpose of inducing magnetic flux in the first leg member 87. Figure 10 shows the mounting of first and second switches 127 and 128 on opposite sides of the shaft 120. These switches have not been shown in detail but may be described as normally open switches which when their actuating plunger is released, provides an open electrical circuit. A cam member 130 is mounted on the end of the shaft 120 and this cam member is adapted to alternately engage the first and second switches 127 and 128 respectively, to close the switch which it engages and to open the other switch which it disengages. The cam member 130 is driven in accordance with the movement of the cylindrical diverter core 116. A first choke coil 132 is mounted on the second leg member 88 and includes a predetermined number of turns of wire around the laminations thereof. Opposite ends or opposite leads 133 and 134 of the first choke coil extend from the coil and are connected to opposite sides of the switch 128. A second choke coil 136 is located on the first vertically spaced member 85 between the second and third leg members 88 and 89, respectively. This second choke coil may be referred to as being in the magnetic circuit of the third leg member since it might be positioned on the third leg member as well as being positioned on the second vertically spaced member between the second and third leg members. The second choke coil is constructed in essentially the same manner as the first choke coil and the opposite leads 137 and 138 of the second choke coil are connected to opposite sides of the switch 127. A handle 141 is secured to the shaft 120 opposite the cam member 130 and is for the purpose of moving the cylindrical diverter core between the first and second positions which are seen in Figures 11 and 12. As best seen in Figure 11, when the handle is located in its first position, it magnetically connects the first leg member to the third leg member and bypasses the second leg member. The flow of magnetic flux has been indicated schematically by the arrows 142. While the handle is in the first position, the cam member 130 engages switch 128 causing the leads 133 and 134 to be electrically connected through the switch. The purpose of this is to provide a coil which will tend to choke off any stray magnetic flux which attempts to flow through the second leg member. When the handle 141 is moved to its second position as shown in Figure 12, the first leg member is magnetically connected to the second leg member and the third leg member is bypassed. When the handle is in this position, the leads 137 and 138 of coil 136 are electrically connected through the switch 127 and any stray magnetic flux which tends to leak through the magnetic circuit of the third leg member is choked off. It will also be appreciated that without the switches 127 and 128 and with the handle located in positions intermediate the first and second positions, that the flux from the first leg member will be divided between the magnetic circuits of the second and third leg members, respectively.

A first pole piece 144 is connected to the second end portion of the second vertically spaced member 86 substantially vertically below the third leg member. The first pole piece 144 extends substantially flush with the top surface of the table 82 as best seen in Figure 18 and includes first and second side portions 145 and 146, respectively. The first side portion 145 (Figure 16) is offset with respect to and extends toward the second leg member 88 farther than the second side portion. The second side portion extends outwardly away from the second leg member 88 further than does the first side portion of the first pole piece. A second pole piece 148 is connected to the lower end of the third leg member 89 and includes first and second side portions 149 and 150, respectively. The first and second side portions of the second pole piece are offset in a manner similar to the side portions of the first pole piece, however, their width is adjustable to accommodate various widths of devices to be demagnetized which are located in the space 106. Means are provided for adjusting the position of the first and second side portions of the second pole piece with respect to the third leg member and this means includes a squeeze member 153 for each of the first and second side portions and these members extend through the lower portion of the third leg member and are secured to the respective side portions of the second pole piece by means and screws 154 which extend therethrough and into the side portions. In order to fix the position of the side portions with respect to the third leg, all that need be done is to tighten the screws 154 thereby squeezing the member 153 and its respective side portion together thus prohibiting movement. In order to adjust the same, all that need be done is to loosen the screws 154 and then the side member may be moved within limits.

Adjustable means are provided for adjustably securing the third leg member to the second end portion 103 of the first vertically spaced member 85. This adjustable means includes a rack 157 suitably secured to the third leg member 89. A pinion 158 is rotatably mounted on a bracket 159 which is carried by the channel members 93 of the first vertically spaced member. The pinion is in engagement with the rack and is driven by means of a worm 161 and worm wheel 162. When the desired positioning of the third leg member has been obtained, then it is desirable to positively locate the third leg so that it will not change its position. To accomplish this end, a positioning device has been provided and this includes a rotatable member 164 which is mounted by the channel members 93 and which has an end portion 165 which is adapted to engage the rack 157 and prevent the third leg member from raising and lowering. When it is desired to move the third leg member it is only necessary to loosen the rotatable member 164 and then the third leg member may be moved.

The entire core means which includes the first and second vertically spaced members, the first and second and third leg means, the pole piece 144 and 148, and the diverter core 116 have been provided with magnetic insulation means 168. The magnetic insulation means 168 serves to divide the permeable core means into two parallel parts. The insulation means, as seen in the instant embodiment, extends in generally a vertical plane in the direction of all of the above referred to elements of the permeable core means. It has been found that with this type of construction that when an object is located in the air space 106 (Figure 9) that a much better flux distribution through the object can be obtained. For example, the magnetic flux flowing in the one half of the permeable core means would flow down the third leg member into the first side portion 149 of the second pole piece across the air gap and through the piece to be de-magnetized and then into the first side portion 145 of the first pole piece. In the other one half of the permeable core means, the flux would flow down the third leg member and into the second side portion 150 of the second pole piece and from there across the air gap through the object to be de-magnetized and into the second side portion 146 of the first pole piece. With this type of construction, the object being de-magnetized receives a better flux distribution therethrough and therefore is more thoroughly and quickly de-magnetized.

In operation an object to be de-magnetized is placed in the air space 106 between the first and second pole pieces 144 and 148, respectively. The third leg member which carries the second pole piece, is adjusted to the proper position with respect to the object by means of the adjustment means which includes the rack and pinion gears as well as the worm and the worm wheel. The position of the third leg member is fixed by means of the rotatable member 164. The primary winding 122 is energized from the alternating power source 124 which induces magnetic flux in the first leg member 87. The handle 141 is moved from the position of Figure 12 to the position of Figure 11. This causes magnetic flux to travel from the first leg member through the third leg member by way of the first and second vertically spaced members 85 and 86. With the flux traveling in this path, the flux flows through the object to be de-magnetized. The choke coil 132 prevents stray flux from flowing through the second leg member 88. After the object to be de-magnetized has been in the magnetic flux path for a predetermined period of time, the handle 141 is moved from the position of Figure 11 to the position of Figure 12. As the cylindrical diverter core is moved in accordance with the movement of the handle, the amplitude of the magnetic flux wave form through the third leg member is gradually decreased down to a point which approximates zero amplitude. This is desirable since the magnetic wave form through the third leg member cannot be shut off when at a high amplitude and is not desirably shut off until the wave form is at zero amplitude. This is readily accomplished by the instant use of the diverter core because rotation of the core gradually diverts all of the flux from the third leg to the second leg. This assures that the device is turned off with the flux wave form 15 substantially zero.

Figure 20:
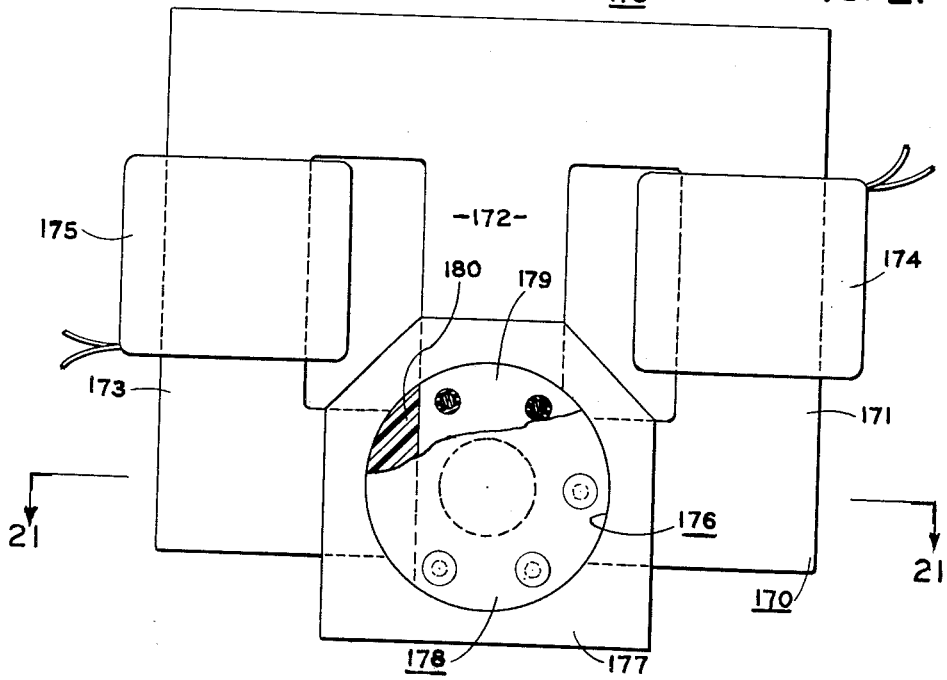
Figure 20 is a side elevational view of a transformer utilizing the principle of the magnetic flux diverter shown in Figures 11 and 12.

Figure 20 illustrates how the principles of the invention, as applied to the de-magnetizer, may be applied to a transformer. Figure 20 shows a transformer 170 made from a stack of laminations sandwiched together. The transformer includes first, second and third legs 171, 172, and 173, respectively. A primary coil 174 is located on the first leg 171 and a secondary coil is located on the third or opposite leg. Wall means 176 define a generally cylindrical opening at the place where the second or middle leg 172 intersects the lower straight run portion of the transformer. A non-magnetic bearing member 177 is also provided at this position and helps define the cylindrical opening. The construction at this place in the transformer is quite similar to the construction shown in Figures 11 and 12. Positioned in the cylindrical opening 176 is a cylindrical diverter core 178 and this diverter core includes a first segmental portion 179 which is made up of a plurality of laminations sandwiched together and a second segmental portion 180 made of a plastic construction. Connected to the cylindrical diverter core 178 is a handle 181 which may be utilized to move the diverter core between positions which correspond to the positions shown in Figures 11 and 12. With this construction, it is possible to balance the flow of flux from the first leg, which is induced by the primary coil 174, between the second leg 172 and the third leg 173. This may be varied to divide the flux flow substantially half way between the second and third legs to a point where substantially all of the flux flows through the second leg and none through the third leg and vice versa. It will also be recognized by those skilled in the art that another coil might be placed on the second leg 172 if desired and the output of this leg might be connected to the same load as coil 175 or might be connected to an entirely separate load.

This application is a continuation-in-part of my application, Serial No. 524,105, filed July 25, 1955, entitled Apparatus for De-Magnetizing a Magnetic Body.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A de-magnetizer including in combination a frame, a horizontal table of insulating material mounted on said frame, permeable core means mounted on said frame, said core means including first and second vertically spaced members each having first and second end portions and first, second, and third leg members, said first leg member extending between said first end portions of said first and second vertically spaced members and being secured thereto, said second leg member secured to an intermediate portion of said first vertically spaced member and extending toward an intermediate portion of said second vertically spaced member and terminating in arcuate wall means, said third leg member adjustably secured to said second end portion of said first vertically spaced member and extending toward said second end portion of said second vertically spaced member, said second vertically spaced member comprising first and second portions spaced from each other at their respective ends by arcuate wall means located adjacent said arcuate wall means of said second leg member, a bearing member at said arcuate wall means of said second leg and vertically spaced member, said bearing member and said arcuate wall means defining a cylindrical opening, a cylindrical core located in said cylindrical opening, said cylindrical core comprising first and second segmental cylinder portions, said first segmental cylinder portion comprising magnetic conducting material and said second segmental cylinder portion comprising magnetic insulating material, a primary winding on said first leg member, conductor means connecting said primary winding to an alternating current source, first and second switches mounted adjacent said cylindrical core and movable between open and closed positions, a cam member alternately engageable with said first and second switches, said cam member being connected to and driven by said cylindrical core, a first choke coil on said second leg member, opposite ends of said first choke coil being connected to opposite sides of said first switch, a second choke coil on said first vertically spaced member between said second and third leg members, opposite ends of said second choke coil being connected to opposite sides of said second switch, a handle secured to said cylindrical core for moving the same between first and second positions, movement of said handle to said first position magnetically connecting said first leg member to said third leg member and bypassing said second leg member while closing said first switch to connect the opposite ends of said first choke coil, movement of said handle to said second position magnetically connecting said first leg member to said second leg member and bypassing said third leg member while closing said second switch to connect the opposite ends of said second choke coil, a first pole piece connected to said second end portion of said second vertically spaced member below said third leg member, said first pole piece extending substantially flush with said table and including first and second side portions, said first side portion of said first pole piece being offset with respect to and extending toward said second leg member farther than said second side portion of said first pole piece, said second side portion extending outwardly away from said second leg member further than said first side portion, a second pole piece connected to the lower end of said third leg member and including first and second side portions, means for adjusting said first and second side portions of said second pole piece in the direction of said second vertically spaced member to vary the width, adjustable means for adjustably securing said third leg member to said second end portion of said first vertically spaced member, said adjustable means including a rack secured to said third leg member, a pinion engaging said rack and rotatably mounted by said first vertically spaced member, a worm and worm wheel to drive said pinion, and magnetic insulation means for dividing said permeable core means into two parallel parts, said insulation means extending in generally a vertical plane in the direction of said first and second vertically spaced members and said first, second and third leg members.

2. A de-magnetizer including in combination a frame, a horizontal table of insulating material mounted on said frame, permeable core means mounted on said frame, said core means including first and second vertically spaced members each having first and second end portions and first, second, and third leg members, said first leg member extending between said first end portions of said first and second vertically spaced members and being secured thereto, said second leg member secured to an intermediate portion of said first vertically spaced member and extending toward an intermediate portion of said second vertically spaced member and terminating in arcuate wall means, said third leg member adjustably secured to said second end portion of said first vertically spaced member and extending toward said second end portion of said second vertically spaced member, said second vertically spaced member comprising first and second portions spaced from each other at their respective ends by arcuate wall means located adjacent said arcuate wall means of said second leg member, a bearing member at said arcuate wall means of said second leg and vertically spaced member, said bearing member and said arcuate wall means defining a cylindrical opening, a cylindrical core located in said cylindrical opening, said cylindrical core comprising first and second segmental cylinder portions, said first segmental cylinder portion comprising magnetic conducting material and said second segmental cylinder portion comprising magnetic insulating material, a primary winding on said first leg member, conductor means connecting said primary winding to an alternating current source, first and second switches mounted adjacent said cylindrical core and movable between open and closed positions, a cam member alternately engageable with said first and second switches, said cam member being connected to and driven by said cylindrical core, a first choke coil on said second leg member, opposite ends of said first choke coil being connected to opposite sides of said first switch, a second choke coil on said first vertically spaced member between said second and third leg members, opposite ends of said second choke coil being connected to opposite sides of said second switch, a handle secured to said cylindrical core for moving the same between first and second positions, movement of said handle to said first position magnetically connecting said first leg member to said third leg member and bypassing said second leg member while closing said first switch to connect the opposite ends of said first choke coil, movement of said handle to said second position magnetically connecting said first leg member to said second leg member and bypassing said third leg member while closing said second switch to connect the opposite ends of said second choke coil, a first pole piece connected to said second end portion of said second vertically spaced member below said third leg member, said first pole piece extending substantially flush with said table and including first and second side portions, said first side portion of said first pole piece being offset with respect to and extending toward said second leg member farther than said second side portion of said first pole piece, said second side portion extending outwardly away from said second leg member further than said first side portion, a second pole piece connected to the lower end of said third leg member and including first and second side portions, means for adjusting said first and second side portions of said second pole piece in the direction of said second vertically spaced member to vary the width, adjustable means for adjustably securing said third leg member to said second end portion of said first vertically spaced member, said adjustable means including a rack secured to said third leg member, a pinion engaging said rack and rotatably mounted by said first vertically spaced member, and a worm and worm wheel to drive said pinion.

3. A de-magnetizer including in combination a frame, permeable core means mounted on said frame, said core means including first and second vertically spaced members each having first and second end portions and first, second, and third leg members, said first leg member extending between said first end portions of said first and second vertically spaced members and being secured thereto, said second leg member secured to an intermediate portion of said first vertically spaced member and extending toward an intermediate portion of said second vertically spaced member and terminating in arcuate wall means, means adjustably securing said third leg member to said second end portion of said first vertically spaced member, said third leg member extending toward said second end portion of said second vertically spaced member, said second vertically spaced member comprising first and second portions spaced from each other at their respective ends by arcuate wall means located adjacent said arcuate wall means of said second leg member, a bearing member at said arcuate wall means of said second leg and vertically spaced member, said bearing member and said arcuate wall means defining a cylindrical opening, a cylindrical core located in said cylindrical opening, said cylindrical core comprising first and second segmental cylinder portions, said first segmental cylinder portion comprising magnetic conducting material and said second segmental cylinder portion comprising magnetic insulating material, a primary winding on said first leg member, conductor means connecting said primary winding to a power source, first and second switches mounted adjacent said cylindrical core and movable between open and closed positions, cam means alternately engageable with said first and second switches, said cam means being driven by said cylindrical core, a first coil on said second leg member, opposite ends of said first coil being connected to opposite sides of said first switch, a second coil on said first vertically spaced member between said second and third leg members, opposite ends of said second coil being connected to opposite sides of said second switch, handle means connected to said cylindrical core for moving the same between first and second positions, movement of said handle means to said first position magnetically connecting said first leg member to said third leg member and bypassing said second leg member while closing said first switch to connect the opposite ends of said first coil, movement of said handle means to said second position magnetically connecting said first leg member to said second leg member and bypassing said third leg member while closing said second switch to connect the opposite ends of said second coil, a first pole piece connected to said second end portion of said second vertically spaced member below said third leg member, said first pole piece including first and second side portions, said first side portion of said first pole piece being offset with respect to and extending toward said second leg member farther than said second side portion of said first pole piece, said second side portion extending outwardly away from said second leg member further than said first side portion, a second pole piece connected to the lower end of said third leg member and including first and second side portions, and means for adjusting said first and second side portions of said second pole piece in the direction of said second vertically spaced member to vary the width.

4. A de-magnetizer including in combination a frame, permeable core means mounted on said frame, said core means including first and second spaced members each having first and second end portions and first, second, and third leg members, said first leg member extending between said first end portions of said first and second spaced members and being secured thereto, said second leg member secured to an intermediate portion of said first spaced member and extending toward an intermediate portion of said second spaced member and terminating in arcuate wall means, said third leg member adjustably secured to said second end portion of said first spaced member and extending toward said second end portion of said second vertically space member, said second spaced member comprising first and second portions spaced from each other at their respective ends by arcuate wall means located adjacent said arcuate wall means of said second leg member, a bearing member at said arcuate wall means of said second leg and spaced member, said bearing member and said arcuate wall means defining a cylindrical opening, a cylindrical core located in said cylindrical opening, said cylindrical core comprising first and second segmental cylinder portions, said first segmental cylinder portion comprising magnetic conducting material and said second segmental cylinder portion comprising magnetic insulating material, a primary winding on said first leg member, first and second switch means movable between open and closed positions, cam means engageable with said first and second switch means, said cam means being driven in accordance with the movement of said cylindrical core, a first coil on said second leg member, opposite ends of said first coil being connected to said first switch means, a second coil in the magnetic circuit of said third leg member, opposite ends of said second coil being connected to said second switch, means for moving said cylindrical core between first and second positions, movement of said cylindrical core to said first position magnetically connecting said first leg member to said third leg member and bypassing said second leg member while closing said first switch means, and movement of said cylindrical core to said second position magnetically connecting said first leg member to said second leg member and bypassing said third leg member while closing said second switch means.

5. A de-magnetizer including in combination a frame, permeable core means mounted on said frame, said core means including first and second spaced members each having first and second end portions and first, second, and third leg members, said first leg member extending between said first end portions of said first and second spaced members and being secured thereto, said second leg member secured to an intermediate portion of said first spaced member and extending toward an intermediate portion of said second spaced member and terminating in arcuate wall means, said third leg member adjustably secured to said second end portion of said first spaced member and extending toward said second end portion of said second spaced member, said second spaced member comprising first and second portions spaced from each other at their respective ends by arcuate wall means located adjacent said arcuate wall means of said second leg member, a bearing member at said arcuate wall means of said second leg and spaced member, said bearing member and said arcuate wall means defining a cylindrical opening, a cylindrical core located in said cylindrical opening, said cylindrical core comprising first and second segmental cylinder portions, said first segmental cylinder portion comprising magnetic conducting material and said second segmental cylinder portion comprising magnetic insulating material, a primary winding on said first leg member, means for moving said cylindrical core between first and second positions, movement of said cylindrical core to said first position magnetically connecting said first leg member to said third leg member and bypassing said second leg member, and movement of said cylindrical core to said second position magnetically connecting said first leg member to said second leg member and bypassing said third leg member.

6. A de-magnetizer including in combination a frame, permeable core means mounted on said frame, said core means including first and second spaced members each having first and second end portions and first, second, and third leg members, said first leg member extending between said first end portions of said first and second spaced members and being secured thereto, said second leg member secured to an intermediate portion of said first spaced member and extending toward an intermediate portion of said second spaced member and terminating in arcuate wall means, said third leg member adjustably secured to said second end portion of said first spaced member and extending toward said second end portion of said second spaced member, said second spaced member comprising first and second portions spaced from each other at their respective ends by arcuate wall means located adjacent said arcuate wall means of said second leg member, a bearing member at said arcuate wall means of said second leg and spaced member, said bearing member and said arcuate wall means defining an annular opening, an annular core located in said annular opening, said annular core comprising first and second annular portions, said first annular portion comprising magnetic conducting material and said second annular portion comprising magnetic insulating material, a primary winding on said first leg member, means for moving said annular core between first and second positions, movement of said annular core to said first position magnetically connecting said first leg member to said third leg member and bypassing said second leg member, and movement of said annular core to said second position magnetically connecting said first leg member to said second leg member and bypassing said third leg member.

7. A de-magnetizer including in combination a frame, permeable core means mounted on said frame, said core means including first and second spaced members each having first and second end portions and first, second, and third leg members, said first leg member extending between said first end portions of said first and second spaced members and being secured thereto, said second leg member secured to an intermediate portion of said first spaced member and extending toward an intermediate portion of said second spaced member and terminating in arcuate wall means, said third leg member secured to said second end portion of said first spaced member and extending toward said second end portion of said second spaced member, said second spaced member comprising first and second portions spaced from each other at their respective ends by arcuate wall means located adjacent said arcuate wall means of said second leg member, said arcuate wall means substantially defining an annular opening, a segmental annular core located in said annular opening, a winding on said first leg member, means for moving said core between first and second positions, movement of said core to said first position magnetically connecting said first leg member to said third leg member and bypassing said second leg member, and movement of said core to said second position magnetically connecting said first leg member to said second leg member and bypassing said third leg member.

8. A magnetic device including in combination core means comprising first and second closed magnetic loop portions, said second loop portion including a portion of said first loop portion, a flux inducing coil on the common portion of said first and second loop portions, wall means defining a cylindrical space at an intersection of said first and second loop portions, a rotatable cylindrical core located in said cylindrical space and comprising first and second segmental cylinders, said first segmental cylinder comprising magnetic conducting material and said second segmental cylinder comprising non-magnetic material, switch means, means driven in accordance with said cylindrical core to move said switch means between first and second conditions, a first choke coil on the uncommon portion of said first magnetic loop portion, a second choke coil on the uncommon portion of said second magnetic loop portion, conductor means connecting said first and second choke coils to said switch means, and means for rotating said cylindrical core between first and second positions, said cylindrical core in said first position establishing a magnetic path for substantially all of said flux to flow in said first loop portion and causing said switch means to move to said second position to connect the ends of said second choke coil and said cylindrical core in said second position establishing a magnetic path for substantially all of said flux to flow in said second loop portion and causing said switch means to move to said first position to connect the ends of said first choke coil.

9. A magnetic device including in combination core means comprising first and second closed magnetic loop portions, said second loop portion including a portion of said first loop portion, a flux inducing coil on the common portion of said first and second loop portions, wall means defining a cylindrical space at an intersection of said first and second loop portions, a rotatable cylindrical core located in said cylindrical space and comprising first and second segmental cylinders, said first segmental cylinder comprising magnetic conducting material and said second segmental cylinder comprising non-magnetic material, and means for rotating said cylindrical core between first and second positions, said cylindrical core in said first position establishing a magnetic path for substantially all of said flux to flow in said first loop portion and in said second position establishing a magnetic path for substantially all of said flux to flow in said second loop portion.

10. A magnetic device including in combination core means comprising first and second closed magnetic loop portions, said second loop portion including a portion of said first loop portion, a flux inducing coil on the common portion of said first and second loop portions, wall means defining an annular space at an intersection of said first and second loop portions, an annular diverter core located in said annular space and comprising first and second annular segmental portions, said first annular segmental portion comprising magnetic conducting material and said second annular segmental portion comprising non-magnetic material, and means for angularly moving said diverter core between first and second positions, said diverter core in said first position establishing a magnetic path for substantially all of said flux to flow in said first loop portion and in said second position establishing a magnetic path for substantially all of said flux to flow in said second loop portion.

11. Apparatus for de-magnetizing a magnetic body including in combination a framework comprising upper and lower straight run portions, first and second leg members extending between said upper and lower straight run portions, each said straight run portion and said leg members including a plurality of supported laminations, a pole member mounted on said lower straight run portion, said pole member adapted to receive a magnetic body during a de-magnetizing operation, a third leg member comprising a plurality of laminations sandwiched together, said third leg member being adjustable vertically and having wall means residing closely adjacent wall means of said upper straight run portion, said third leg member extending toward said pole member, said pole member and said third leg member defining an air space in which a magnetic body to be de-magnetized is adapted to reside, means for fixedly securing said third leg member with respect to said upper straight run portion including a member supported by said framework and operated by threaded means to engage said third leg member and secure the same, and means for adjusting said third leg member to regulate the size of said air space including rack teeth located on said third leg member, and gear means mounted by said framework and intermeshing with said rack teeth.

12. Apparatus for demagnetizing a magnetic body including in combination first and second magnetic core means, said first magnetic core means comprising a framework which includes upper and lower spaced straight run portions interconnected at respective end portions by first and second spaced side straight run portions, each said straight run portion having support members supporting a plurality of laminations, said laminations of said upper straight run portion having continuous wall means defining an annular core space, a pole member mounted on said lower straight run portion, said pole member adapted to receive the magnetic body during a demagnetizing operation, said second magnetic core means comprising opposed plates sandwiching together a plurality of laminations, said second magnetic core means residing in said annular core space and having continuous wall means residing next adjacent said continuous wall means which define said core space with said last mentioned wall means extending completely around said second magnetic core means, said first and last mentioned wall means having substantially zero clearance therebetween, said second magnetic core means extending toward said pole member, said pole member and said second magnetic core means defining an air space in which the magnetic body to be demagnetized is adapted to reside, means for fixedly securing said second magnetic core means with respect to said first magnetic core means including first and second resilient plates mounted by said frame and located at opposed sides of said second magnetic core means and having threaded means extending therebetween to pull said plates into engagement with said second magnetic core means, means for raising and lowering said second magnetic core means to regulate the size of said air space including rack teeth located on the outside of each of said opposed plates and first and second gears mounted by said framework and intermeshing respectively with said rack teeth on each of said opposed plates, and coil means for magnetically energizing said magnetic core means.

13. Apparatus for demagnetizing a magnetic body including in combination first and second magnetic core means, said first magnetic core means comprising a framework which includes upper and lower spaced straight run portions interconnected at respective end portions by first and second spaced side straight run portions, each said straight run portion having support members supporting a plurality of laminations, said laminations of said upper straight run portion having continuous wall means defining an annular core space, a pole member mounted on said lower straight run portion, said pole member adapted to receive the magnetic body during a demagnetizing operation, said second magnetic core means comprising opposed plates sandwiching together a plurality of laminations, said second magnetic core means residing in said annular core space and having continuous wall means residing next adjacent said continuous wall means which define said core space with said last mentioned wall means extending completely around said second magnetic core means, said second magnetic core means extending toward said pole member, said pole member and said second magnetic core means defining an air space in which the magnetic body to be demagnetized is adapted to reside, means for fixedly securing said second magnetic core means with respect to said first magnetic core means including first and second plates mounted by said frame and located at opposed sides of said second magnetic core means and having threaded means extending therebetween to pull said plates into engagement with said second magnetic core means, and means for raising and lowering said second magnetic core means to regulate the size of said air space including rack teeth located on the outside of each of said opposed plates, first and second gears mounted by said framework and intermeshing respectively with said rack teeth on each of said opposed plates.

14. A magnetic device including in combination core means comprising in combination first and second loop portions, said second loop portion including a portion of said first loop portion, a flux inducing coil on said core means, wall means defining a space at an intersection of said first and second loop portions, a diverter core located in said space at said intersection of said first and second loop portions, and means for moving said diverter core between first and second positions, said diverter core in said first position establishing a magnetic path for substantially all of said flux to flow in said first loop portion and in said second position establishing a magnetic path for substantially all of said flux to flow in said second loop portion.

15. A magnetic device including in combination core means comprising first and second magnetic loop portions, said second loop portion including a portion of said first loop portion, a flux inducing coil on said core means, wall means defining a cylindrical space at an intersection of said first and second loop portions, a rotatable diverter core located in said cylindrical space, said diverter core comprising a segment of a cylinder and being constructed of magnetic conducting material, and means for rotating said diverter core between first and second positions, said diverter core in said first position establishing a magnetic path for substantially all of said flux to flow in said first loop portion and in said second position establishing a magnetic path for substantially all of said flux to flow in said second loop portion.

16. A magnetic device including in combination core means comprising first and second magnetic loop portions, said second loop portion including a portion of said first loop portion, a flux inducing coil on said core means, wall means defining an annular space at an intersection of said first and second loop portions, an angularly movable diverter core located in said annular space, said diverter core comprising a segment of an annular member and being constructed of a magnetic conducting material, and means for angularly moving said diverter core between first and second positions, said diverter core in said first position establishing a magnetic path for substantially all of said flux to flow in said first loop portion and in said second position establishing a magnetic path for substantially all of said flux to flow in said second loop portion.

17. Apparatus for de-magnetizing a magnetic body including in combination a framework comprising upper and lower straight run portions, first and second leg members extending between said upper and lower straight run portions, each said straight run portion and said leg members including a plurality of supported laminations, a pole member mounted on said lower straight run portion, said pole member adapted to receive a magnetic body during a de-magnetizing operation, a third leg member comprising a plurality of laminations sandwiched together, said third leg member being adjustable vertically and having wall means residing closely adjacent wall means of said upper straight run portion, said third leg member extending toward said pole member, said pole member and said third leg member defining an air space in which a magnetic body to be demagnetized is adapted to reside, means for fixedly securing said third leg member with respect to said upper straight run portion, and means for adjusting said third leg member to regulate the size of said air space.

References Cited in the file of this patent

FOREIGN PATENTS 846,133    Germany _____ Aug. 11, 1952